(12) United States Patent
Pelissier et al.

(10) Patent No.: US 6,633,948 B1
(45) Date of Patent: Oct. 14, 2003

(54) STACKABLE DUAL MODE (REGISTERED/ UNBUFFERED) MEMORY INTERFACE COST REDUCTION

(75) Inventors: Gerald R. Pelissier, Austin, TX (US); David S. Hwang, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 334 days.

(21) Appl. No.: 09/693,331

(22) Filed: Oct. 20, 2000

(51) Int. Cl.[7] ............................ G06F 12/00; G06F 13/00
(52) U.S. Cl. ........................ 711/5; 711/115; 711/154
(58) Field of Search .......................... 711/5, 115, 149, 711/153, 154, 129, 131; 710/129, 131

(56) References Cited

U.S. PATENT DOCUMENTS

| | | | | |
|---|---|---|---|---|
| 4,480,307 A | * | 10/1984 | Budde et al. | 711/101 |
| 5,058,053 A | * | 10/1991 | Gillett | 711/101 |
| 5,150,279 A | * | 9/1992 | Collins et al. | 361/393 |
| 5,963,464 A | * | 10/1999 | Dell et al. | 365/52 |
| 6,049,467 A | * | 4/2000 | Tamarkin et al. | 361/790 |
| 6,109,929 A | * | 8/2000 | Jasper | 439/74 |
| 6,425,046 B1 | * | 7/2002 | Leung et al. | 711/101 |
| 6,426,560 B1 | * | 7/2002 | Kawamura et al. | 257/777 |

* cited by examiner

Primary Examiner—Tuan V. Thai
(74) Attorney, Agent, or Firm—Rosenthal & Osha L.L.P.

(57) ABSTRACT

A dual mode memory module includes an interface configured to receive a first memory module, a first control circuit for switching between unbuffered and registered/buffered modes, an interface configured to receive a second memory module, and a second control circuit for switching the operation of the second memory module between unbuffered and registered/buffered modes. The control circuit may include a bus switch and a register/buffer operatively coupled to the bus switch. Enable/disable pins may be included operatively coupled to the first bus switch and the first register/buffer and configured so that only one of the first bus switch and the first register/buffer is active at a time. A system controller for detecting a type of memory module connected to the stackable dual mode memory interface and enabling one of the bus switch and register/buffer based on the type of memory module detected may be included.

12 Claims, 5 Drawing Sheets

STACKABLE DUAL MODE (REGISTERED/UNBUFFERED) MEMORY INTERFACE COST REDUCTION

CROSS-REFERENCE TO RELATED APPLICATIONS

The application is related to a new utility patent application Ser. No. 09/693,332 concurrently filed herewith entitled, "Dual Mode (Registered/unbuffered) Memory Interface".

BACKGROUND OF THE INVENTION

In order to execute software programs, most microprocessors require at least some random access memory (RAM). The amount of RAM required by the program is dependent on the nature and complexity of the software application being processed. RAM is contained in discrete memory integrated circuits (ICs).

The RAM ICs are connected to the microprocessor through electrical connections called "nets" (also referred to as wires or traces). The amount of RAM available within a single memory IC is limited by the available manufacturing process technology. Thus, as more RAM is required, more memory ICs must be used.

Further, the microprocessor is electrically limited by the available process technology. This electrical limitation is in the maximum number of devices that can be connected to one of the microprocessor's signal pins. Specifically, each pin presents a capacitive load based on the components attached to it via an electrical net and there is a limit on the maximum capacitive load that can be driven by a signal pin. In certain cases, it is possible that the number of devices required by a microprocessor, in order to provide sufficient RAM, can exceed the number of devices that microprocessor can electrically access.

Generally, if the capacitive load is too high for the microprocessor to manage, an external device called a buffer or register is placed between the microprocessor and the memory ICs. The external buffer or register is designed to handle the higher capacitive load. Those skilled in the art will recognize that registers are distinct from buffers, and whether a buffer or register is used depends on the memory technology being used.

When an external register or buffer is used, an additional delay in the signal path is added, i.e., the maximum rate at which the memory devices can be accessed is slowed down. For higher performance, it is more desirable to use an unbuffered interface, i.e., an interface without any external buffers or registers. However, as discussed above, the combination of total memory requirement and the amount of memory available per device may require the use of a buffered or registered interface.

Also, it is often desirable to provide a microprocessor the use of both unbuffered and registered/buffered memory within the same system. However, in a situation where memory is located on a separate module attached to a microprocessor through a connector and several connectors are available for "memory expansion," a microprocessor may not be able to access a block of unbuffered memory on another module. This results in the requirement that all modules be of the same configuration, either registered/buffered or unbuffered.

Further, when systems having small amounts of unbuffered memory are upgraded to a larger amount of memory that must be registered, e.g., because of the capacitive load created, the unbuffered memory becomes unusable to the microprocessor. As a result, the existing and still functional memory cannot be used. Thus, not only must the desired increased in capacity be purchased, but also replacements for the existing and now unusable memory must be purchased.

Referring to FIG. 1, in a typical computer system, a microprocessor (10) is connected to unbuffered RAM (12) and (14) via electrical nets (20). Also, or alternatively, microprocessor (10) is connected to registered/buffered RAM (18) via electrical net (20) which passes through register/buffer (16). As discussed above, those skilled in the art will appreciate that whether a register or a buffer is used is dependent on the memory technology employed.

As mentioned above, in certain situations a microprocessor is unable to access both unbuffered and registered/buffered memory in the same system. In such a case, if the system is upgraded with larger memory modules that have to be registered, registered memory must be purchased to replace all of the existing unbuffered memory modules in addition to the purchase of the upgrade memory modules.

SUMMARY OF THE INVENTION

In one aspect, a stackable dual mode memory interface comprises an interface configured to receive a first memory module, a first control circuit for switching between unbuffered and registered/buffered modes, an interface configured to receive a second memory module, and a second control circuit for switching the operation of the second memory module between unbuffered and registered/buffered modes.

In one aspect, a method of interfacing a first memory module and a second memory module with a microprocessor comprises switching between unbuffered and registered/buffered mode for the first memory module, interfacing the second memory module with the first memory module, and switching between unbuffered and registered/buffered mode for the second memory module.

In one aspect, a stackable dual mode memory interface comprises means for switching between unbuffered registered/buffered modes for a first memory module, means for interfacing a second memory module with the first memory module, and means for switching between unbuffered registered/buffered modes for the second memory module.

In one aspect, a system for using registered/buffered and unbuffered memory comprises a processor, a first memory module, an interface configured to receive a first memory module and operatively couple the first memory module to the processor, and a second memory module. The first memory module comprises a first control circuit for switching between unbuffered and registered/buffered modes, an interface configured to receive the second memory module, and a second control circuit for switching the operation of the second memory module between unbuffered and registered/buffered modes.

In one aspect, an apparatus for interfacing two memory modules comprises a processor, a first memory module, an interface configured to receive a first memory module and operatively couple the first memory module to the processor, and a second memory module. The first memory module comprises memory; connected in series with the interface configured to receive the first memory module, a first bus switch for selectively connecting the processor and the memory in an unbuffered mode; connected in parallel with the first bus switch and in series with the interface configured to receive the first memory module, a first register/ buffer for selectively connecting the processor and the memory in a registered/buffered mode; and, operatively coupled to the first bus switch and the first register/buffer, enable/disable pins configured so that only one of the first bus switch and the first register/buffer is active at a time.

The first memory module also comprises an interface configured to receive the second memory module; connected in series with the interface configured to receive the second memory module, a second bus switch for selectively connecting the second memory module to the processor in an unbuffered mode; connected in parallel with the second bus switch and in series with the interface configured to receive the second memory module, a second register/buffer for selectively connecting the second memory module to the processor in a registered/buffered mode; and operatively coupled to the second bus switch and the second register/buffer, enable/disable pins configured so that only one of the second bus switch and the second register/buffer is active at a time.

Other aspects and advantages of the invention will be apparent from the following description and the appended claims.

DETAILED DESCRIPTION OF THE INVENTION

Figure 1:
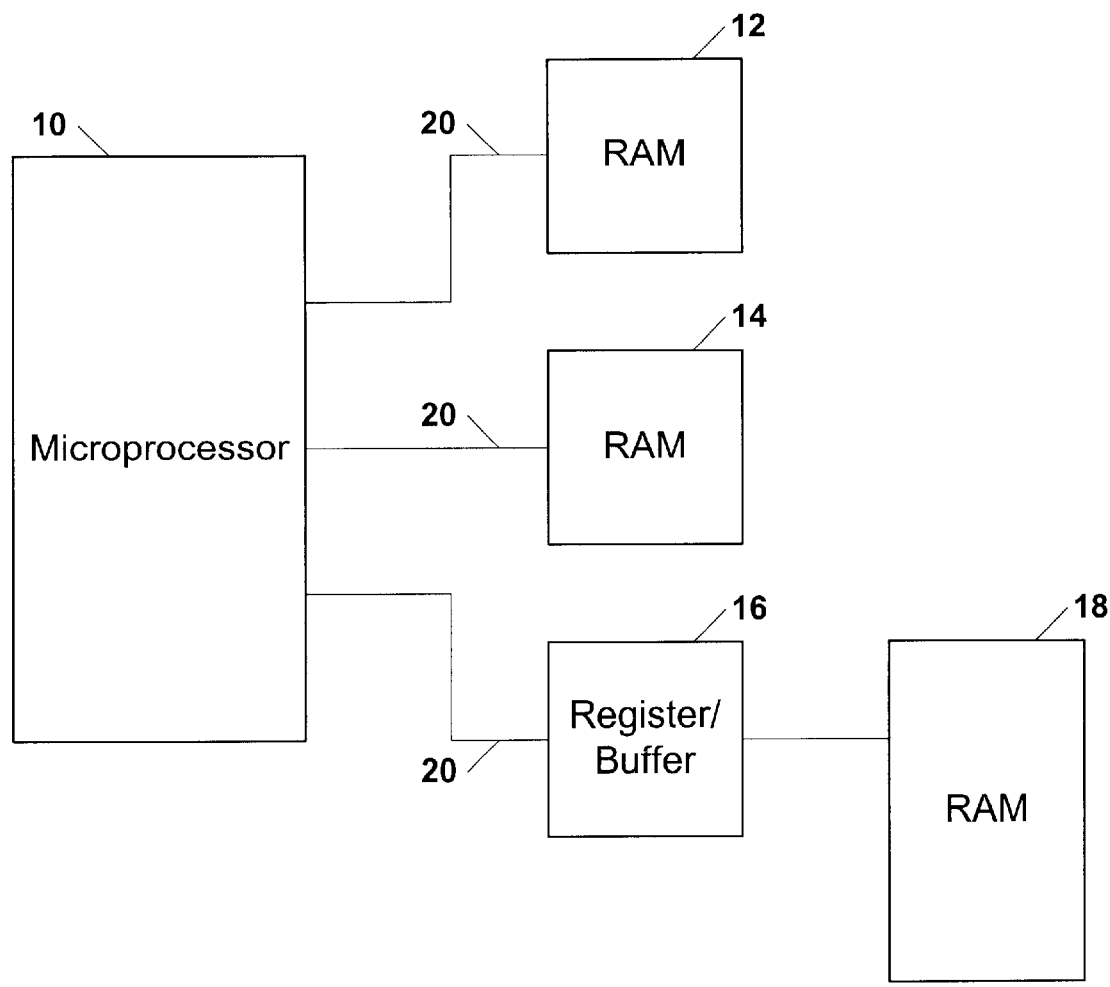
FIG. 1 shows a typical computer system.
Figure 2:
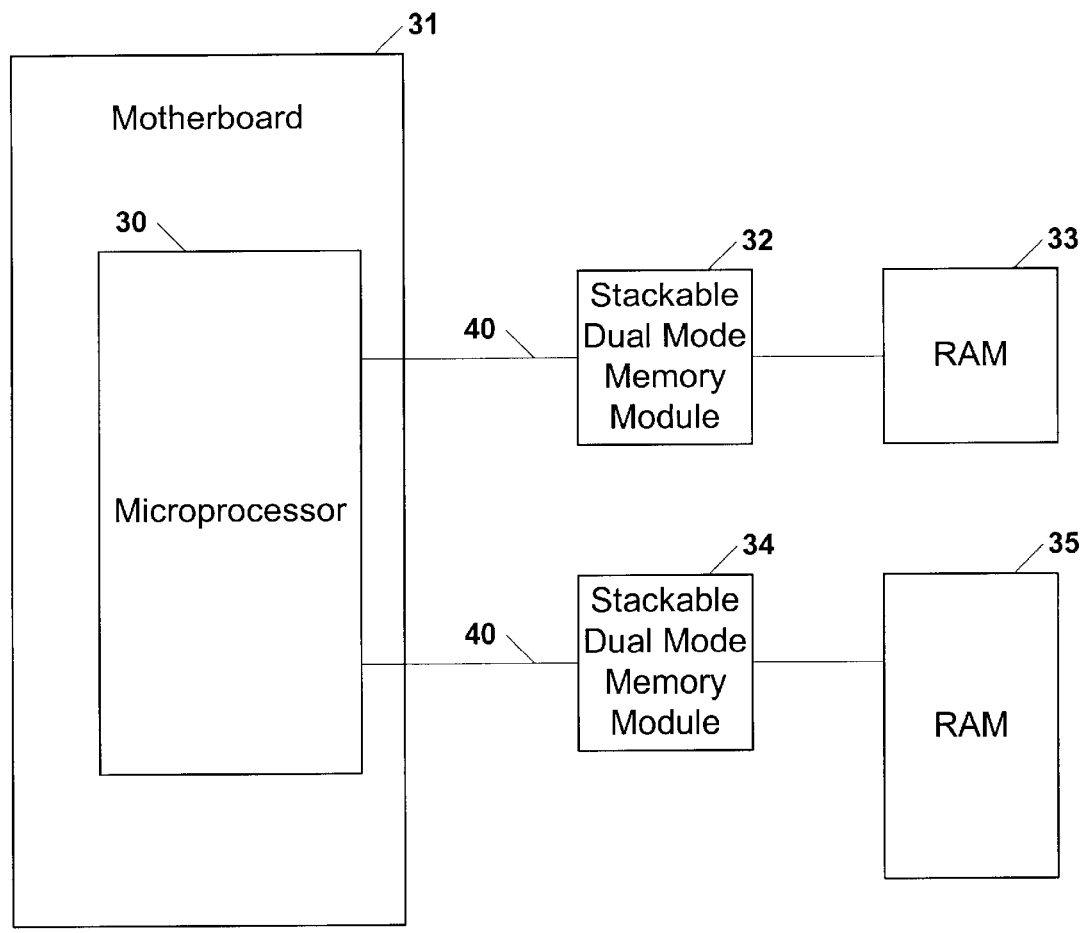
FIG. 2 is a block diagram of a system in accordance with an embodiment of the present invention.

Various embodiments of the invention will now be described with reference to the accompanying figures wherein like reference characters are used for like parts throughout the several views. FIG. 2 is a block diagram of a system in accordance with an embodiment of the present invention.

In certain systems, stackable memory modules are used, i.e., a first memory module is plugged into a motherboard containing a microprocessor and an additional second module is plugged into the first module. Then, the first module propagates the appropriate signal to the second module. In such a system, it is possible to reduce the cost of implementing a dual mode memory module. Generally, memory modules are made stackable due to space constraints. These constraints may be dictated physically or specified by design requirements, for example, the CompactPCI specification. Those skilled in the art will appreciate that there are further reasons designers strive to more efficiently use available space.

FIG. 2 is a block diagram of a system in accordance with one embodiment of the present invention. Microprocessor (30), housed on motherboard (31) is connected to RAM (32), (33), (34), and (35) via electrical nets (40). For purposes of illustration, RAM (32) and (33) are able to be unbuffered, i.e., RAM (32) and (33) is of a size such that a register/buffer is not required between the RAM (32) and (33) and the microprocessor (30). Conversely, RAM (34) and (35) is registered/buffered, i.e., RAM (34) and (35) is of a size that requires a register or buffer between the RAM (34) and (35) and the microprocessor (30). Further, RAM (32) and (34) are implemented as stackable dual mode memory modules in accordance with an embodiment of the present invention.

As can be seen, RAM (33) is stacked onto stackable dual mode memory module (32) and RAM (35) is stacked onto stackable dual mode memory module (34). Stackable dual mode memory modules (32) and (34) allow RAM to be selectively connected to microprocessor (30) unbuffered or registered/buffered. Those skilled in the art will appreciate that the stackable dual mode memory modules may be implemented as RAM with an additional control circuit. Alternatively, the control circuitry of the stackable dual mode memory modules may be separate from RAM and implemented as a stackable dual mode memory circuit.

Figure 3:
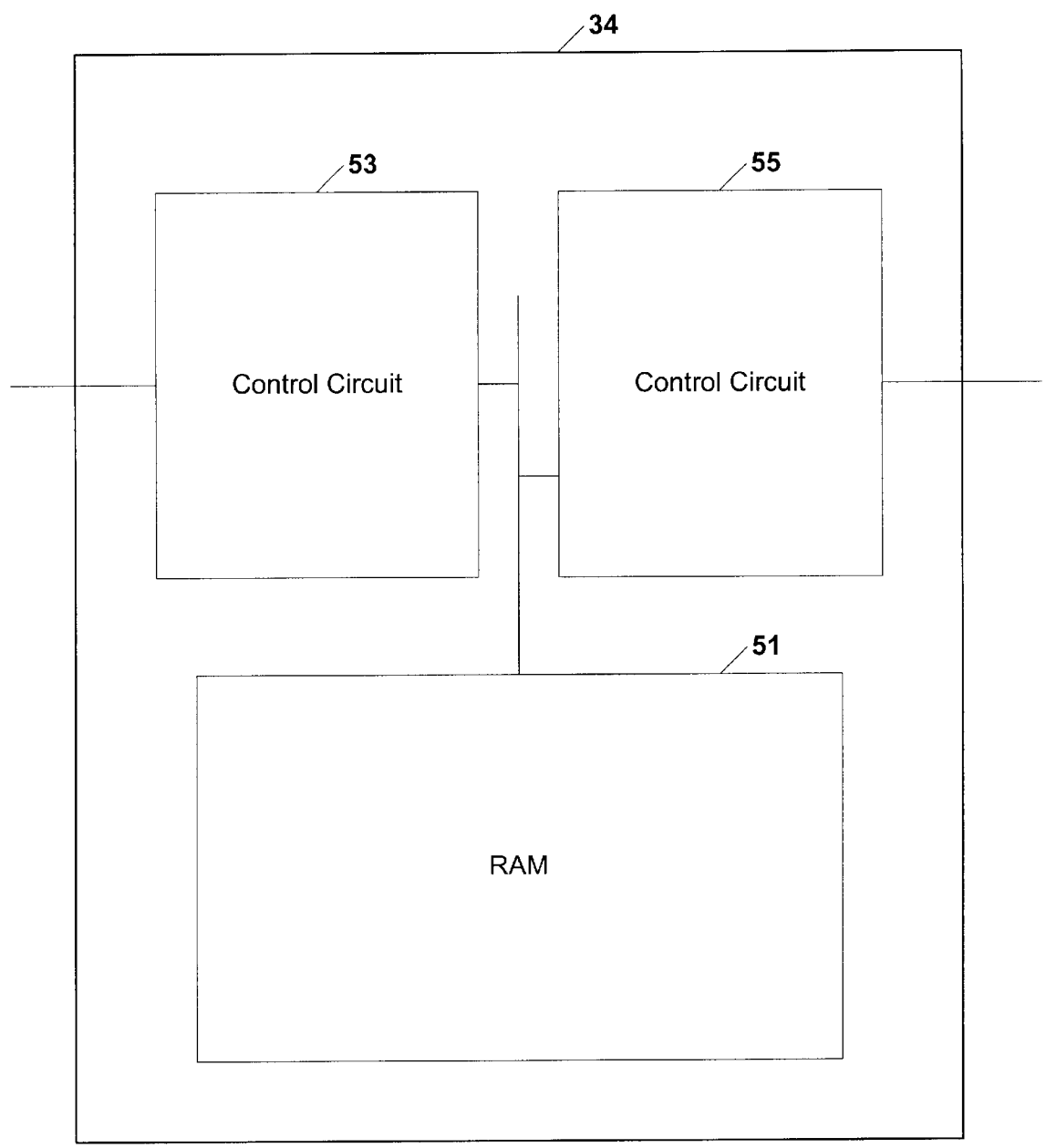
FIG. 3 is a block diagram of a stackable dual mode memory module in accordance with an embodiment of the present invention.

Referring to FIG. 3, a block diagram of a stackable dual mode memory module in accordance with one embodiment of the present invention is shown. As can be seen, the stackable dual mode memory module (34) includes RAM (51) and two control circuits (53) and (55). One of the circuits (53) is used for registering/buffering the memory devices on the module (34). The other circuit (55) is used for handling the signals that get propagated to the next module, which may or may not be unbuffered or registered/buffered. Control circuits (53) and (55) may be implemented as described in detail below with reference to FIG. 4.

Figure 4:
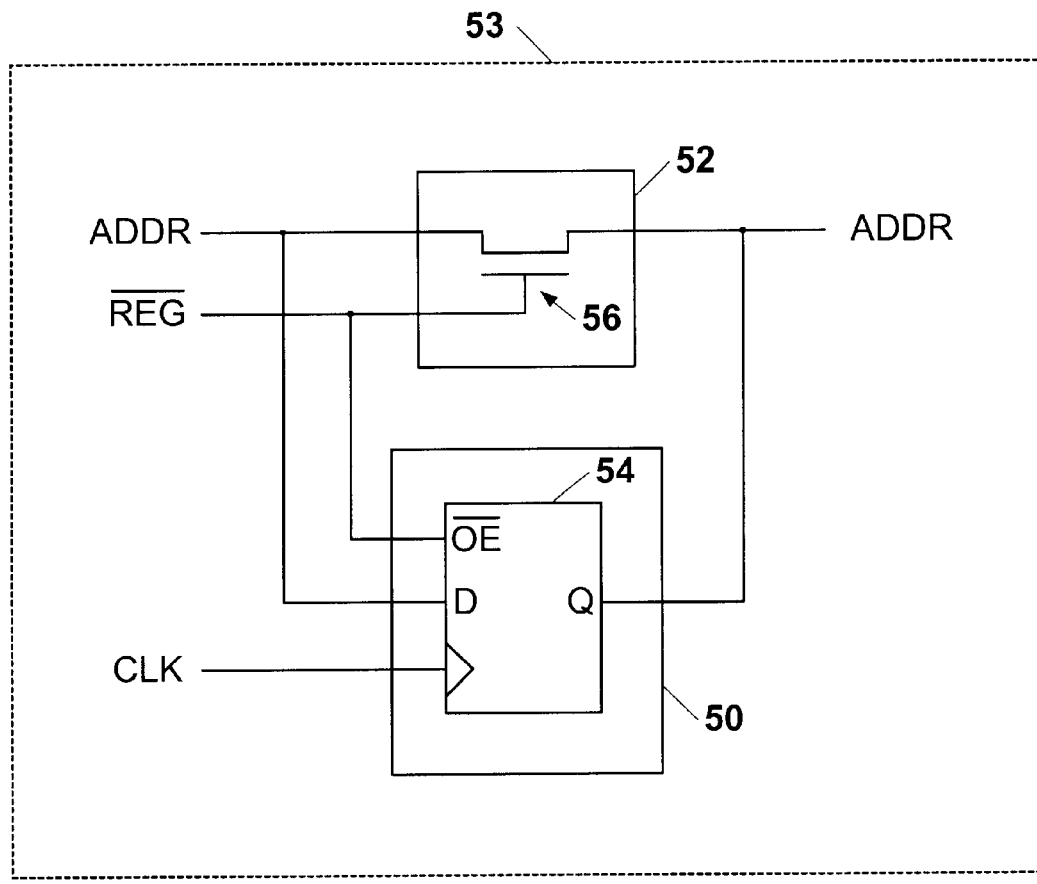
FIG. 4 is a circuit diagram of a control circuit in accordance with an embodiment of the present invention.

Referring to FIG. 4, an exemplary control circuit in accordance with one embodiment of the present invention is shown. The register/buffer mode control circuit (53) includes not only a register/buffer (50), but also a bus switch (52). Both the register and the bus switch have an "enable/disable" pin to control whether they are active or inactive. The circuit is configured so that only one of the bus switch and the register/buffer are active at any time. When the bus switch is active, the memory interface is in "unbuffered mode," and when the register is active, the memory interface is in "registered mode."

As can be seen, the circuit may be implemented using a D flip-flop, or "set-reset" flip-flop (54). The flip-flop (54) is connected in line with the address line to be registered/buffered (ADDR). The address line (ADDR) is fed into the input (D) of the flip-flop and reaches the output of the control circuit (53) via the output of the flip-flop (Q). The flip-flop (54) is connected to a system clock signal (CLK) which controls when the state of the flip-flop (54) may change. Also, the flip-flop (54) has an output enable terminal ($\overline{OE}$) that enables/disables the flip-flop (54). The output enable ($\overline{OE}$) terminal receives a register/buffer signal ($\overline{REG}$) indicative of whether the control circuit (53) should be operating in registered/buffered or unbuffered mode.

A transistor (56) is also connected in line with the address line to be registered/buffered and in parallel with the flip-flop (54). The register/buffer signal ($\overline{REG}$) is connected to the gate of transistor (56) and controls whether the transistor (56) is active. When active, the transistor acts as a pass gate, allowing the address line to be directly connected to the output of the control circuit (53). This occurs when the control circuit is operating in unbuffered mode. Those skilled in the art will appreciate that, in such a configuration, either the transistor (56) or the flip-flop (54) is active at any given time and, accordingly, the address line is registered/buffered or unbuffered.

Figure 5:
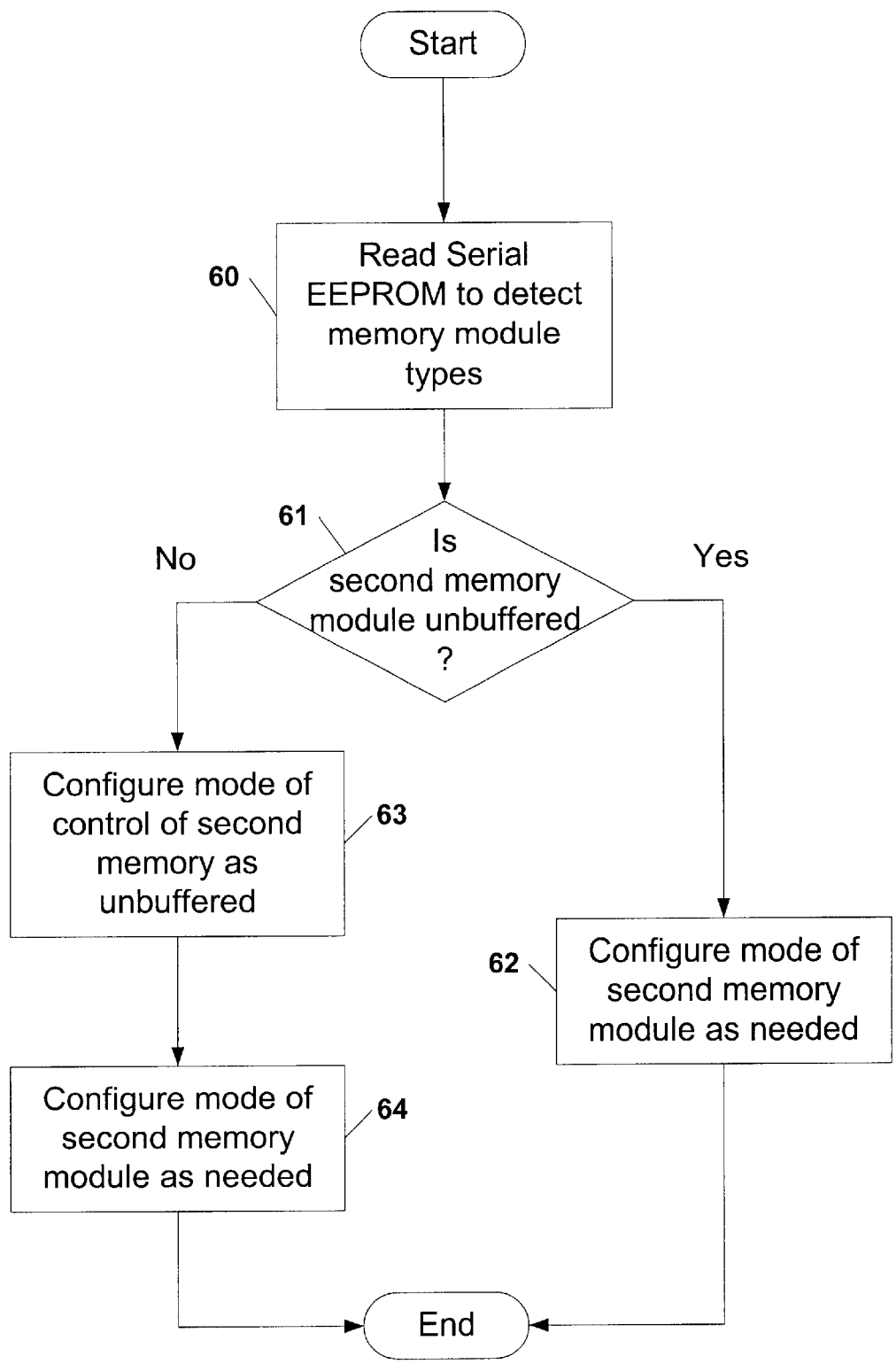
FIG. 5 is a flow chart showing a process in accordance with an embodiment of the present invention.

Referring to FIG. 5, a process in accordance with an embodiment of the invention is shown. In one embodiment, the stackable dual mode memory module may be implemented as a microprocessor or other form of system controller that reads a Serial EEPROM located on a memory module to determine what types of memory modules are available (step 60). This reading of the Serial EEPROM (step 60) may be a typical Serial Presence Detect function. Then, if a second memory module is detected, the stackable dual mode memory module configures its control circuitry differently. If the second memory is determined to be an unbuffered memory module (step 61), the stackable dual mode memory module configures its control circuitry for each of the first and second memory modules to operate in the proper mode (step 62).

Alternatively, if the second memory module is determined to be registered/buffered (step 61), the first memory module configures its control circuitry for the second memory module as unbuffered (step 63) and, then, the second memory module is allowed to control its operating mode as needed (step 64). As mentioned above, the process could configure the second memory module to operate in unbuffered mode and the stackable dual mode memory module would then configure its control circuitry for each of the first and second memory modules to operate in the proper mode.

Advantages of the present invention may include one or more of the following. In the case of a memory upgrade from a single, unbuffered module to a larger memory configuration requiring the use of a buffered module, a stackable dual mode memory module could be used as the first memory module, i.e., the memory module that plugs into the motherboard and is used to control the second memory module. The stackable dual mode memory module can switch its interface with the microprocessor between unbuffered and registered/buffered modes. Also, the stackable dual mode memory module can switch the interface of the second memory module between unbuffered and registered/buffered modes. Thus, both modules can effectively operate in either unbuffered or registered/buffered modes in the system despite the fact that the original memory module is an unbuffered memory.

In the case of a memory upgrade from a single dual mode memory module as described to multiple dual mode memory modules, a stackable dual mode memory module could be used as the first memory module, i.e., the memory module that plugs into the motherboard and is used to control the second memory module. The stackable dual mode memory module can switch its interface with the microprocessor between unbuffered and registered/buffered modes.

Also, the stackable dual mode memory module can switch the interface of the second memory module between unbuffered and registered/buffered modes. However, in this case, because the second memory module has control circuitry as well, the first memory module may switch its control circuitry for the second memory module to operate in the unbuffered mode and allow the second module to switch between unbuffered and registered/buffered modes. Alternatively, the second memory module can be switched to operate in unbuffered mode and allow the first memory module to switch between unbuffered and registered/buffered modes. Thus, both modules can effectively operate in either unbuffered or registered/buffered modes in the system.

Therefore, in situations where a system has unbuffered memory modules already installed and a large memory capacity is desired, the stackable dual mode registered/buffered memory modules can be used in combination with the existed unbuffered memory modules. This reduces the cost of expanding memory capacity. As described above, the stackable dual mode registered/buffered memory modules accomplish the interface by recognizing that the stacked unbuffered memory module is unbuffered and enabling local registers to buffer/register the memory. If, on the other hand, the stacked memory module is buffered, the stackable dual mode memory module disables the local registers and avoids unnecessary double buffering of the second memory module.

The registered/buffered mode control circuit can be implemented using "off-the-shelf" components, i.e., an external bus switch and an external register or buffer. Alternatively, a new integrated circuit (IC) can be designed that incorporates both the register or buffer and bus switch within a single IC package. A dual mode memory module can be fashioned so that it operates in either an unbuffered mode or a registered/buffered mode. The operation of the memory module is configurable automatically or by external control.

As used herein and will be understood by those skilled in the art, motherboard is a generic term meaning any printed circuit board including, but not limited to, passive backplanes, active backplanes, etc. Also, as used herein and will be understood by those skilled in the art, an interface is any connection that allows communication among devices whether that communication be electrical, optical, etc. Further, the term interfacing refers to connecting devices to allow any form of communication, e.g., electrical, optical, etc.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A stackable dual mode memory interface comprising:
   an interface configured to receive a first memory module;
   a first control circuit for switching between unbuffered and registered/buffered modes, wherein the first control circuit comprises:
   a bus switch: and
   a register/buffer operatively coupled to the bus switch;
   enable/disable pins operatively coupled to the bus switch and the register/buffer of the first control circuit, wherein the enable/disable pins are configured so that only one of the bus switch and the register/buffer is active at a time
   an interface configured to receive a second memory module; and
   a second control circuit for switching the second memory module between unbuffered and registered/buffered modes.

2. The stackable dual mode memory interface of claim 1, further comprising:
   a system controller for detecting a type of memory module connected to the stackable dual mode memory interface and enabling one of the bus switch and register/buffer based on the type of memory module detected.

3. A method for interfacing a first memory module and a second memory module with a microprocessor, comprising:
   switching between unbuffered and registered/buffered mode for the first memory module, wherein the first memory module comprises a bus switch and a register/buffer, and wherein the switching comprises:

detecting a type of the first memory module connected; and enabling one of the bus switch and register/buffer based on the type of memory module detected;

interfacing the second memory module with the first memory module; and switching between unbuffered and registered/buffered mode for the second memory module.

4. A stackable dual mode memory interface comprising:

means for switching between unbuffered registered/buffered modes for a first memory module, wherein the first memory module comprises a bus switch and a register/buffer, and wherein the means for switching comprises:

means for detecting a type of the first memory module connected; and means for enabling one of the bus switch and register/buffer based on the type of memory module detected;

means for interfacing a second memory module with the first memory module; and means for switching between unbuffered and registered/buffered modes for the second memory module.

5. A system for using registered/buffered and unbuffered memory comprising:

a processor;

a first memory module;

an interface configured to receive a first memory module and operatively couple the first memory module to the processor;

a second memory module, wherein the first memory module comprises a first control circuit for switching between unbuffered and registered/buffered modes, a system controller for detecting a type of memory module connected to the stackable dual mode memory interface and enabling one of a bus switch and a register/buffer of the first control circuit based on a type of memory module detected;

an interface configured to receive the second memory module; and a second control circuit for switching the second memory module between unbuffered and registered/buffered modes.

6. The system of claim 5, wherein the first control circuit comprises a first bus switch; and a first register/buffer operatively coupled to the bus switch; and the second control circuit comprises a second bus switch; and a second register/buffer operatively coupled to the bus switch.

7. The system of claim 5, further comprising:

enable/disable pins operatively coupled to the bus switch and the register/buffer of the first control circuit, wherein the enable/disable pins are configured so that only one of the bus switch and the register/buffer is active at a time.

8. An apparatus for interfacing two memory modules comprising:

a processor;

a first memory module;

an interface configured to receive a first memory module and operatively couple the first memory module to the processor;

a second memory module, wherein the first memory module comprises memory;

connected in series with the interface configured to receive the first memory module, a first bus switch for selectively connecting the processor and the memory in an unbuffered mode;

connected in parallel with the first bus switch and in series with the interface configured to receive the first memory module, a first register/buffer for selectively connecting the processor and the memory in a registered/buffered mode;

operatively coupled to the first bus switch and the first register/buffer, enable/disable pins configured so that only one of the first bus switch and the first register/buffer is active at a time;

an interface configured to receive the second memory module;

connected in series with the interface configured to receive the second memory module, a second bus switch for selectively connecting the second memory module to the processor in an unbuffered mode;

connected in parallel with the second bus switch and in series with the interface configured to receive the second memory module, a second register/buffer for selectively connecting the second memory module to the processor in a registered/buffered mode;

operatively coupled to the second bus switch and the second register/buffer, enable/disable pins configured so that only one of the second bus switch and the second register/buffer is active at a time.

9. The apparatus of claim 8, further comprising:

a system controller for detecting a type of memory module connected to the stackable dual mode memory interface and enabling one of the bus switch and register/buffer based on the type of memory module detected.

10. The apparatus of claim 8, wherein the second memory is a unbuffered memory and the second register/buffer is enabled so that the second memory operates in registered/buffered mode.

11. The apparatus of claim 8, wherein the second memory is a registered/buffered memory and the second bus switch is enabled the second memory is directly connected to the processor.

12. A computer comprising:

an interface configured to receive a first memory module;

a first control circuit for switching between unbuffered and registered/buffered modes, wherein the first control circuit comprises:

a bus switch; and a register/buffer operatively coupled to the bus switch;

a system controller for detecting a type of memory module connected to the stackable dual mode memory interface and enabling one of the bus switch and register/buffer based on the type of memory module detected, an interface configured to receive a second memory module; and a second control circuit for switching the second memory module between unbuffered and registered/buffered modes.

* * * * *

UNITED STATES PATENT AND TRADEMARK OFFICE
CERTIFICATE OF CORRECTION

PATENT NO. : 6,633,948 B1
DATED : October 14, 2003
INVENTOR(S) : Gerald R. Pelissier et al.

It is certified that error appears in the above-identified patent and that said Letters Patent is hereby corrected as shown below:

<u>Title page, Item [54] and Column 1, lines 1-3,</u>
Replace "STACKABLE DUAL MODE (REGISTERED/UNBUFFERED MEMORY INTERFACE COST REDUCTION" with -- STACKABLE DUAL MODE (REGISTERED/UNBUFFERED MEMORY INTERFACE --.

Signed and Sealed this

Thirtieth Day of December, 2003

JAMES E. ROGAN
*Director of the United States Patent and Trademark Office*